United States Patent
Cudak et al.

(10) Patent No.: US 8,949,216 B2
(45) Date of Patent: Feb. 3, 2015

(54) DETERMINING CHARACTERISTIC PARAMETERS FOR WEB PAGES

(71) Applicant: International Business Machines Corporation, Armonk, NY (US)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 13/707,809

(22) Filed: Dec. 7, 2012

(65) Prior Publication Data

US 2014/0164349 A1   Jun. 12, 2014

(51) Int. Cl.
*G06F 17/30* (2006.01)
*G06F 15/16* (2006.01)

(52) U.S. Cl.
CPC .......... *G06F 17/30864* (2013.01); *G06F 17/30* (2013.01); *G06F 15/16* (2013.01)
USPC .... 707/709; 707/748; 707/769; 707/E17.014; 715/203; 715/234; 715/760; 709/204; 709/217; 709/242; 705/7.36; 705/26

(58) Field of Classification Search
CPC .......... G06F 17/3089; G06F 17/30864; G06F 17/30867; G06F 17/30873; G06F 17/30905; G06F 17/2247; G06F 17/24; G06F 17/241; G06F 17/211; G06F 17/30; G06F 15/16; G06Q 30/02; G06Q 10/10; H04L 29/08072; H04L 29/0809
USPC .......... 707/769, 748, E17.014, 709, 706, 722; 709/204, 217, 242, 219, 223, 224, 245; 715/203, 234, 243, 760; 705/7.36, 26
See application file for complete search history.

(56) References Cited

U.S. PATENT DOCUMENTS 7,624,173 B2 * 11/2009 Bary et al. ................. 709/224
7,672,943 B2    3/2010 Wong et al.

(Continued)

OTHER PUBLICATIONS

Baoyao Zhou ; Sch. of Comput. Eng., Nanyang Technol. Univ., Singapore ; Siu Cheung Hui ; Kuiyu Chang—"An intelligent recommender system using sequential Web access patterns"—Published in: Cybernetics and Intelligent Systems, 2004 IEEE Conference on (vol. 1 ) Date of Conference: Dec. 1-3, 2004 pp. 393-398 vol. 1 Print ISBN.*

(Continued)

*Primary Examiner* — Anh Ly
(74) *Attorney, Agent, or Firm* — Edward J. Lenart; Mark McBurney; Biggers Kennedy Lenart Spraggins LLP (57) ABSTRACT

A computer receives a search request, wherein the search request contains one or more parameters that allow a search to be performed. Responsive to the search request, the computer identifies a plurality of web pages connected by a plurality of links. The computer determines the number of links in the longest path that connects at least a portion of the plurality of web pages, wherein the longest path includes a sequence of at least two web pages of the plurality of web pages connected by a link of the plurality of links. The computer determines the number of links included in a web page of the plurality of web pages.

20 Claims, 3 Drawing Sheets

(56) References Cited

U.S. PATENT DOCUMENTS

| | | | |
|---|---|---|---|
| 7,836,039 | B2 | 11/2010 | Clark et al. |
| 8,082,246 | B2 | 12/2011 | Meyerzon et al. |
| 8,150,846 | B2 | 4/2012 | Kohanim et al. |
| 8,732,192 | B2* | 5/2014 | Mallempati et al. .......... 707/769 |
| 2002/0032699 | A1* | 3/2002 | Edwards et al. .............. 707/513 |
| 2003/0188016 | A1* | 10/2003 | Agarwalla et al. ............ 709/241 |
| 2003/0191800 | A1* | 10/2003 | Challenger et al. ........... 709/203 |
| 2003/0191812 | A1* | 10/2003 | Agarwalla et al. ............ 709/217 |
| 2004/0199430 | A1* | 10/2004 | Hsieh ............................. 705/26 |
| 2004/0205586 | A1* | 10/2004 | Cohen et al. .................. 715/513 |
| 2005/0262050 | A1 | 11/2005 | Fagin et al. |
| 2007/0083671 | A1* | 4/2007 | Linn et al. ..................... 709/245 |
| 2007/0234200 | A1* | 10/2007 | Farn .............................. 715/513 |
| 2007/0266126 | A1* | 11/2007 | Clark et al. ................... 709/223 |
| 2007/0276961 | A1* | 11/2007 | Chi et al. ...................... 709/241 |
| 2008/0010268 | A1* | 1/2008 | Liao et al. ......................... 707/5 |
| 2008/0114800 | A1* | 5/2008 | Gazen et al. ................... 707/101 |
| 2010/0005087 | A1* | 1/2010 | Basco et al. ....................... 707/5 |
| 2010/0114862 | A1* | 5/2010 | Young et al. .................. 707/709 |
| 2011/0004504 | A1* | 1/2011 | Ives et al. ......................... 705/10 |
| 2012/0130974 | A1 | 5/2012 | Leigh et al. |
| 2012/0150899 | A1* | 6/2012 | Minton et al. ................. 707/769 |
| 2013/0085993 | A1* | 4/2013 | Li et al. ......................... 707/636 |

OTHER PUBLICATIONS

Wang Xiao-gang ; Wuhan Univ. of Sci. & Eng., Wuhan, China ; Li Yue—"Web mining based on user access patterns for web personalization"—Published in: Computing, Communication, Control, and Management, 2009. CCCM 2009. ISECS International Colloquium on (vol. 1 ) Date of Conference: Aug. 8-9, 2009 pp. 194-197.*

* cited by examiner

DETERMINING CHARACTERISTIC PARAMETERS FOR WEB PAGES

FIELD OF THE INVENTION

The present invention relates generally to the field of organizing search results, and more particularly to the organization of search engine search results using the determined characteristics of web pages.

BACKGROUND OF THE INVENTION

The World Wide Web (WWW) is comprised of an expansive network of interconnected computers upon which businesses, governments, groups, and individuals throughout the world maintain inter-linked computer files known as web pages. The WWW contains billions of documents (e.g., web pages) that are identified by respective uniform resource locators (URLs). Users can navigate these web pages by means of computer software programs commonly known as Internet browsers. Internet search engines index WWW documents, rank them, and perform queries against them. Web crawlers are applications that download web pages and index the downloaded web pages (and respective URLs) according to a particular categorization scheme. Web crawlers are often utilized to populate the document indices upon which search engines rely.

Due to the vast number of WWW sites (which include collections of web pages) many web pages have a redundancy of information or share a strong likeness in either function or title. The vastness of the unstructured WWW can cause users to rely primarily on Internet search engines to retrieve information or to locate businesses. A typical search engine has an interface with a search window where the user enters an alphanumeric search expression or keywords. The search engine sifts through available web sites for the search terms, and returns the search of results in the form of web pages in, for example, HTML. Each search result comprises a list of individual entries that have been identified by the search engine as satisfying the search expression. Each entry or "hit" comprises a hyperlink that points to a Uniform Resource Locator (URL) location or web page.

SUMMARY

Embodiments of the present invention disclose a method, computer program product, and system for determining characteristic parameters for web pages. A computer receives a search request, wherein the search request contains one or more parameters that allow a search to be performed. Responsive to the search request, the computer identifies a plurality of web pages connected by a plurality of links. The computer determines the number of links in the longest path that connects at least a portion of the plurality of web pages, wherein the longest path includes a sequence of at least two web pages of the plurality of web pages connected by a link of the plurality of links. The computer determines the number of links included in a web page of the plurality of web pages.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Websites and web pages can use key phrases and keywords to effectively trick users into visiting sites that seemingly offer the user the desired search results. However, if a user is presented with additional data about each search result, then the user may be able to select those search results which are more significant in view of the search parameters and/or desired information. By determining additional parameters, associating them with a given search result and then applying them as part of a sorting and ranking procedure the number of useful search results can be increased. For example, a user may go to a first search result (a web page) to see reviews of a book, only to discover that the link is really a commercial for a book website that uses keywords offering to let the user write a review for the book, while not actually having any current reviews of it. A second search result actually opens a page that has links to a dozen web sites that all have reviews of the book and additional links containing related information. Thus, the second search result provides a number of reviews on the book as well as links to reviews of other books by the same author and maybe even biographies of the author. By applying additional data about each search result, to the results of a search, misleading search results can be identified and removed through filtering. Therefore, a filter utilizing additional data about each search result, such as a link path, may actually become more significant than the relevance of the key word for mining useful data or desired data from search queries.

Figure 1:
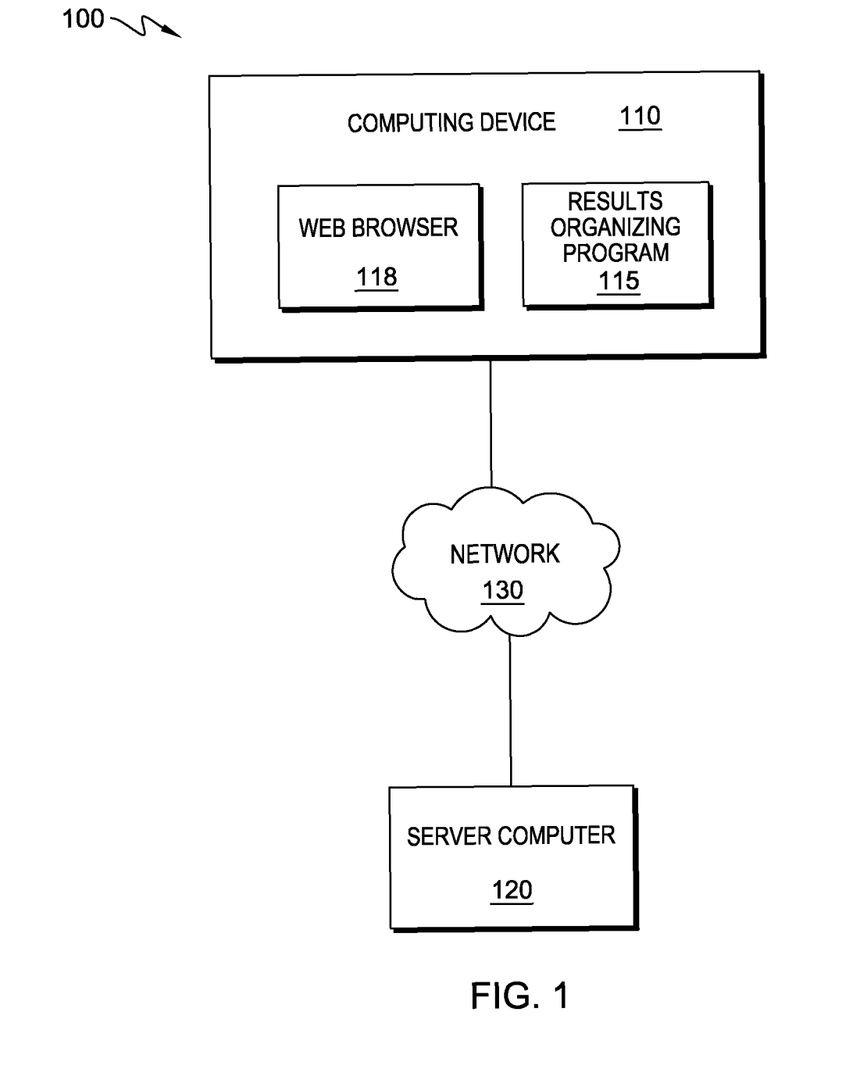
FIG. 1 is a functional block diagram illustrating an internet browsing environment, in accordance with an embodiment of the present invention.

The present invention will now be described in detail with reference to the Figures. FIG. 1 is a functional block diagram illustrating an internet browsing environment, generally designated 100, in accordance with one embodiment of the present invention.

Internet browsing system 100 includes computing device 110 that includes results organizing program 115 and web browser 118. Computing device 110 is interconnected to server computer 120 over network 130.

In this exemplary embodiment, results organizing program 115 and web browser 118 are stored on computing device 110. However, in other embodiments, results organizing program 115 and web browser 118 may be stored externally and accessed through a communication network 130. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 110 and server computer 120 in accordance with a desired embodiment of the present invention.

In various embodiments of the present invention, computing device 110 and server computer 120 can be personal digital assistants (PDAs), smart phones, servers, laptop computers, tablet computers, netbook computers, personal computers (PCs), or desktop computers. In another embodiment, computing device 110 represents a computing system utilizing clustered computers and components to act as a single pool of seamless resources. In general, computing device 110 can be any computing device or a combination of devices with access to the data stored in server computer 120 and is capable of running results organizing program 115 and web browser 118. Computing device 110 and server computer 120 may include internal and external hardware components, as depicted and described in further detail with respect to FIG. 3.

In an exemplary embodiment, server computer 120 is a server that includes web pages and web sites. In general, server computer 120 functions as part of the World Wide Web (WWW) and includes data that can be searched for and retrieved by computing device 110.

In an exemplary embodiment, web browser 118 and results organizing program 115, of computing device 110, operate in conjunction to perform searches of the WWW. Web browser 118 includes a search engine and a web crawler. The web crawler of web browser 118 downloads web pages, indexes the downloaded web pages (and respective uniform resource locators (URLs)) according to a particular categorization scheme, and populates document indices upon which the search engine relies. The internet search engine of web browser 118 accesses and performs queries against document indices, and ranks the downloaded and/or indexed web pages and web sites. The process of ranking the downloaded and/or indexed web pages and web sites is augmented by the execution of results organizing program 115.

In an exemplary embodiment, results organizing program 115 augments the process of ranking search results (i.e. the downloaded/indexed web pages and web sites) by adding additional sorting/filtering parameters. In general, the parameters of depth and width are added to a given search result (e.g., web page or web site), which, in theory, should contain at least a portion of the desired (searched for) data. The depth parameter represents the number of successive links (i.e., the longest path or the longest chain), which satisfy the search criteria and/or a search parameter, that can be followed from a given search result (i.e. opening a first link would retrieve a web site or web page that contains a second link etc.). Search criteria or search parameters can include keywords, key phrases and even settings and options applied to the web browser. For example, a browser setting can include a parameter such as a threshold value that restricts returned search results to only those results which have minimum depth rating of eight. In general, a given link or website can be used or counted only once when determining the longest path/chain. In other words, there is no repetition or repeating of links and websites when determining the longest path/chain. For example, a search for hair tonic yields a search result that includes six different successive links, with each of the six different successive links containing information regarding hair tonic. The search result would thus have a depth parameter of six and each link could be opened sequentially to gain access to all six web sites or web pages.

In an exemplary embodiment, the width parameter represents the number of links included in a search result that is related to the desired data by other data such as associated metadata (e.g., metadata, or the like, corresponding to the web page), a search criteria (e.g., a keyword, a key phrase or a numerical value used for the search), or the settings and options applied to the web browser, or any combination thereof. For example, a search result for lilac perfume includes fourteen links to web sites and web pages that include the key phrase lilac perfume. The search result would thus have a width parameter of fourteen. In another example, the width and depth parameters are determined for each search result included in a given page of search results (i.e., a page by page basis). For example, if a search returns five pages of search results then only the first page of results will have the width and depth parameters determined. If the user selects a different page of results then the width and depth parameters will be determined for that page of results.

Results organizing program 115, can utilize the depth parameter and/or width parameter of a search result (e.g., a web page or a web site) for the sorting, filtering and ranking of search results. For example, a depth threshold value of five can be applied to remove any search results that have a depth greater than five links. A minimum width value of eight can then be applied to remove search results that include fewer than eight links. The remaining search results can be ranked based on their associated depth and width values.

In another example, a search for DVD reviews of a movie may bring up the web sites X and Y. Site X may not have a review of the movie but simply offers the user an opportunity to be the first to review the movie. Site Y is a site that gathers reviews from other sites and actually contains twenty links to other review sites, and each of those sites may provide two sites with reviews of the movie. Thus, site Y provides the user with a width of twenty on the keyword search and a depth of two, while site X provides width of one and a depth of zero since it is a single web site string. In aforementioned example the wider and deeper parameter values of site Y would guide a user to visit site Y even if the search order based on the web browser listed site Y as the ninth most significant search result and site X as the most significant search result.

In an exemplary embodiment, the depth and width parameters of search results are shown adjacently to the given search result. Furthermore, the depth and width parameters may change in value and be displayed to the user as the user visits the links provided through the search results. In one example, the depth and width parameters of search results may be displayed as a numerical width and depth facet beside each result provided in the search results. In another example, the depth and width parameters of search results may be utilized to modify the order in which search results are displayed (e.g., deeper and wider parameter values moves a search possibility closer to the front of a list of search results). For example, the combined numerical value of the depth and width parameters associated with respective search results can be used to rank a group of search results according to the highest combined value. In another example the numerical value of the depth parameter is divided by the numerical value of the width parameter and the resulting value is used to organize the search results according to the lowest resulting value. In other embodiments, depth and width parameters are displayed in a pop up screen as a cursor is moved over the given search result. The application and visual presentation of depth and width parameters can vary in other embodiments.

In other embodiments, results organizing program 115 can incorporate additional parameters to evaluate one or more of the subject metadata, description metadata (i.e., subject headings and descriptors), and link anchor text associated with a search result. In general, subject metadata, such as subject headings, are comprehensive in coverage; they describe the content of an entire digital object or information resource. However, in practice, subject metadata is often assigned, for example, for an entire book. For example, a search for mythology books could utilize the search keyword "mythology", which is the subject metadata, and the search results would be an alphabetical browse index that starts at mythology.

In general, unlike subject metadata, description metadata (i.e., descriptors) does not necessarily reflect the coverage of the entire digital object or information resource. A description metadata may describe only one part or concept included in the digital object or information resource. In other words, unlike subject metadata, description metadata is not generally designed to create alphabetical browse displays. Instead, description metadata is designed to accommodate Boolean searching. Boolean searching utilizes connector terms such as "and", "or" and "not". By linking two or more keywords, used for a search, with a connector term the number of search result hits can be expanded or narrowed. For example, a search using the keyword "television" yields 978 hits and a search using the keyword violence yields 568 hits. However, a search using both keywords and a connector term such as "and" (i.e., "television and violence") yields 34 hits.

In general, link anchor text (a.k.a. anchor text, link label, link text, or link title) is the visible, clickable text that can follow a hyperlink and is often regarded as metadata created by others. For example, in the hyperlink "<a href="Http://en.URL.org/">SmallB</a>" the term SmallB which follows the hyperlink is an example of anchored text. The words contained in the anchor text can be matched to keywords during a search and can help determine what ranking an associated search result will receive by a search engine. Link anchor text can be much more effective in identifying best answers to queries than other textual evidence.

Furthermore, results organizing program 115 can also apply parameters that evaluate evidence that is independent of the query (unlike subject and description metadata) such as URL length and URL type, and may substantially improve the effectiveness of searches. For example, given a group of ten search results, the search result with the shortest URL length may be more significant to the query than the search result with the longest URL length and would be ranked accordingly. In still other embodiments, results organizing program 115 and web browser 118 are integral and operate as a single program which retains the functionality of both results organizing program 115 and web browser 118.

Figure 2:
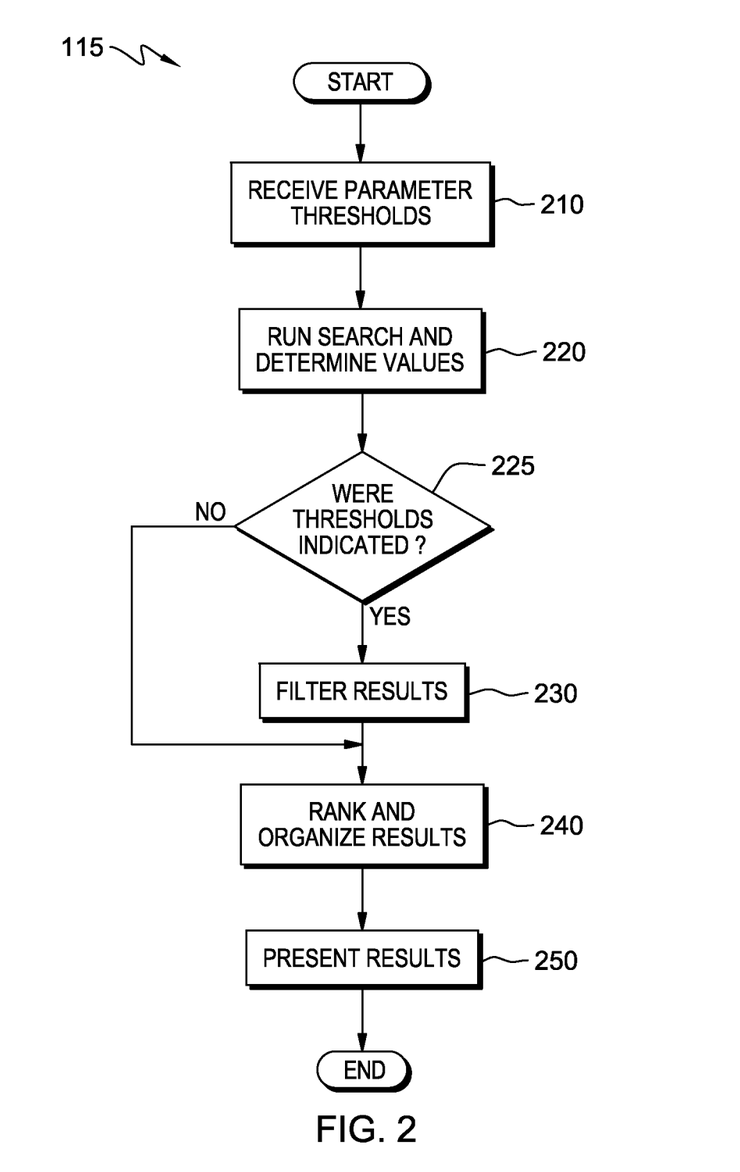
FIG. 2 illustrates operational steps of a results organizing program, on a computing device within the internet browsing environment of FIG. 1, in accordance with an embodiment of the present invention.

FIG. 2 is a flowchart depicting operational steps of results organizing program 115 for organizing the search results produced by web browser 118 in accordance with an embodiment of the present invention.

Results organizing program 115 receives width and depth parameter threshold values and/or a range for the parameter values (step 210). For example, a user enters the width and depth parameter threshold values, into respective fields included in the graphical user interface (GUI) of a web browser. A threshold value can make the filtering and ranking of search results more effective and provide a final list of results that are much more likely to contain the desired information. However, in some exemplary embodiments, receiving an indication of the threshold values is an optional step. If threshold values are not indicated, then results organizing program 115 will proceed to step 220.

Results organizing program 115 runs an internet search via web browser 118, receives a list of search results from web browser 118, and determines width and depth parameter values for a select number of the search results (step 220). Results organizing program 115 can determine width and depth parameter values for any number of search results, the number may be modified by a user. For example, a user enters the number of search results, which are to have respective width and depth parameter values determined, into a respective field included the graphical user interface (GUI) of a web browser. In an exemplary embodiment the parameter values for the first fifty search results are calculated. The parameter values for other search results not included in the group of fifty are determined as needed (e.g., a user selects a search result that is not included in the first fifty search results).

If width and depth parameter threshold values were indicated (decision step 225, YES branch) then results organizing program 115 filters the search results according to those criterion (step 230) and the remaining search results are retained, ranked and organized (step 240). For example, of the two hundred returned search results, only thirty five met the minimum threshold values and are retained. The thirty five remaining search results are then ranked and organized. If no threshold values were indicated (decision step 225, NO branch), then results organizing program 115 skips the filtering step (230) and proceeds to ranking and organizing the search results (step 240).

In step 240 of this embodiment, results organizing program 115 applies user preferences to rank and organize the remaining search results according to their associated width and depth parameter values. In general, the user preferences determine the manner in which the results are treated, organized and ranked, i.e., a user is presented with a number of organizational and ranking options from which they make selections. For example, two possible options could be to rank the remaining results to reflect the ranking presented by the web browser, or to organize the remaining results according to the determined depth and/or width parameters of the remaining results.

Results organizing program 115 presents the ranked and organized results (step 250). In this exemplary embodiment, results organizing program 115 presents the remaining search results in the form of a pop-up window. The pop-up window shows a list of the remaining search results, which are ranked and organized, along with their associated depth and width parameter values displayed next to each given search result and/or on each individual webpage that is navigated to by the user.

Figure 3:
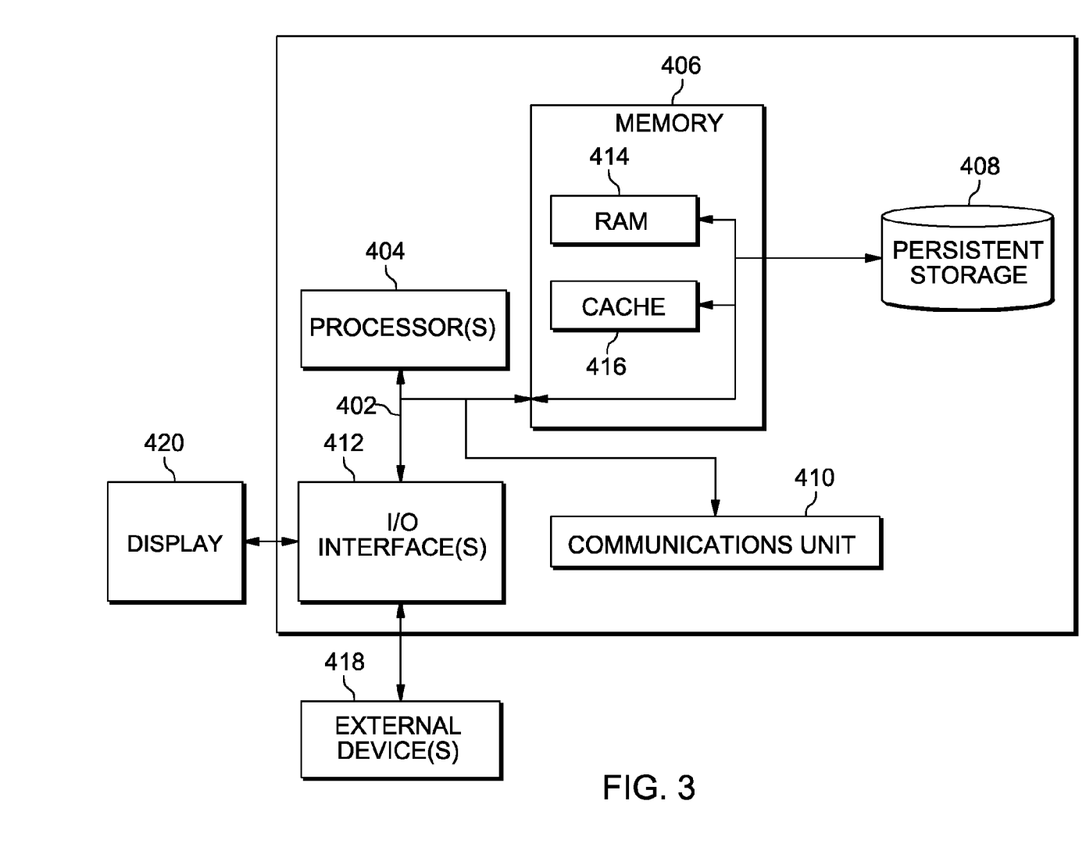
FIG. 3 depicts a block diagram of components of a server computer and the computing device executing the results organizing program, in accordance with an embodiment of the present invention.

FIG. 3 depicts a block diagram of components of computing device 110 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Results organizing program 115 and web browser 118 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including the resources of server computer 120. In these examples, communications unit 410 includes one or more network interface cards. Communications unit 410 may provide communications through the use of either or both physical and wireless communications links. Results organizing program 115 and web browser 118 may be downloaded to persistent storage 408 through communications unit 410.

I/O interface(s) 412 allows for input and output of data with other devices that may be connected to computing device 110. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., results organizing program 115 and web browser 118, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining characteristic parameters for web pages, the method comprising:
    a computer receiving a search request, wherein the search request contains one or more parameters that allow a search to be performed;
    the computer receiving a threshold value for a determined number of links in a longest path;
    responsive to performing the search, the computer identifying a plurality of web pages connected by a plurality of links;
    the computer determining a number of links included in a longest path that connects at least a portion of the plurality of web pages, wherein the longest path includes a sequence of at least two web pages of the plurality of web pages connected by a link of the plurality of links, wherein the longest path does not include a repetition of one or both of the links and web pages included in the longest path; and
    the computer determining a number of links included in a web page of the plurality of web pages.

2. The method of claim 1, wherein one or both of the determined number of links in the longest path and the determined number of links included in the web page of the plurality of web pages include one or more links that satisfy a parameter used for the search.

3. The method of claim 1, further comprising the step of:
    the computer receiving a threshold value for the determined number of links included in the web page.

4. The method of claim 1, further comprising the step of:
    the computer organizing the plurality of web pages based on one or more of the determined number of links in the longest path, the determined number of links included in the web page, and a metadata corresponding to a web page.

5. The method of claim 1, further comprising the step of:
    the computer filtering the plurality of web pages based on one or more of the determined number of links in the longest path, the determined number of links included in the web page, and a metadata corresponding to a web page.

6. The method of claim 1, further comprising the step of:
    the computer displaying, for one or more web page of the plurality of web pages, one or both of the determined number of links in the longest path and the determined number of links included in the web page.

7. The method of claim 1, further comprising the step of:
    the computer loading a web page included in the plurality of web pages;
    the computer determining, for the loaded web page, one or both of a number of links in a longest path of the loaded web page and a number of links included in the loaded web page; and
    the computer displaying, the number of links in the longest path of the loaded web page and the number of links included in the loaded web page.

8. A computer program product for determining characteristic parameters for search results, the computer program product comprising:
    one or more computer-readable storage media and program instructions stored on the one or more computer-readable storage media, the program instructions comprising:
        program instructions to receive a search request, wherein the search request contains one or more parameters that allow a search to be performed;
        program instructions to receive a threshold value for a determined number of links in a longest path;
        program instructions to, responsive to performing the search, identify a plurality of web pages connected by a plurality of links;
        program instructions to determine a number of links included in a longest path that connects at least a portion of the plurality of web pages, wherein the longest path includes a sequence of at least two web pages of the plurality of web pages connected by a link of the plurality of links, wherein the longest path does not include a repetition of one or both of the links and web pages included in the longest path; and
        program instructions to determine a number of links included in a web page of the plurality of web pages.

9. The computer program product of claim 8, wherein one or both of the determined number of links in the longest path and the determined number of links included in the web page of the plurality of web pages include one or more links that satisfy a parameter used for the search.

10. The computer program product of claim 8, further comprising:
    program instructions to receive a threshold value for the determined number of links included in the web page.

11. The computer program product of claim 8, further comprising the step of:
    program instructions to organize the plurality of web pages based on one or more of the determined number of links in the longest path, the determined number of links included in the web page, and a metadata corresponding to a web page.

12. The computer program product of claim 8, further comprising:
    program instructions to filter the plurality of web pages based on one or more of the determined number of links in the longest path, the determined number of links included in the web page, and a metadata corresponding to a web page.

13. The computer program product of claim 8, further comprising:
    program instructions to display, for one or more web page of the plurality of web pages, one or both of the determined number of links in the longest path and the determined number of links included in the web page.

14. The computer program product of claim 8, further comprising:
    program instructions to load a web page included in the plurality of web pages;
    program instructions to determine, for the loaded web page, one or both of a number of links in a longest path of the loaded web page and a number of links included in the loaded web page; and
    program instructions to display, the number of links in the longest path of the loaded web page and the number of links included in the loaded web page.

15. A computer system for determining characteristic parameters for search results, the computer system comprising:
    one or more computer processors;
    one or more computer-readable storage media;
    program instructions stored on the computer-readable storage media for execution by at least one of the one or more processors, the program instructions comprising:
    program instructions to receive a search request, wherein the search request contains one or more parameters that allow a search to be performed;
    program instructions to receive a threshold value for a determined number of links in a longest path;
    program instructions to, responsive to performing the search, identify a plurality of web pages connected by a plurality of links;
    program instructions to determine a number of links included in a longest path that connects at least a portion of the plurality of web pages, wherein the longest path includes a sequence of at least two web pages of the plurality of web pages connected by a link of the plurality of links, wherein the longest path does not include a repetition of one or both of the links and web pages included in the longest path; and
    program instructions to determine a number of links included in a web page of the plurality of web pages.

16. The computer system of claim 15, wherein one or both of the determined number of links in the longest path and the determined number of links included in the web page of the plurality of web pages include one or more links that satisfy a parameter used for the search.

17. The computer system of claim 15, further comprising:
    program instructions to load a web page included in the plurality of web pages;
    program instructions to determine, for the loaded web page, one or both of a number of links in a longest path of the loaded web page and a number of links included in the loaded web page; and
    program instructions to display, the number of links in the longest path of the loaded web page and the number of links included in the loaded web page.

18. The computer system of claim 15, further comprising the step of:
    program instructions to organize the plurality of web pages based on one or more of the determined number of links in the longest path, the determined number of links included in the web page, and a metadata corresponding to a web page.

19. The computer system of claim 15, further comprising:
    program instructions to filter the plurality of web pages based on one or more of the determined number of links in the longest path, the determined number of links included in the web page, and a metadata corresponding to a web page.

20. The computer system of claim 15, further comprising:
    program instructions to display, for one or more web page of the plurality of web pages, one or both of the determined number of links in the longest path and the determined number of links included in the web page.

* * * * *